UNITED STATES PATENT OFFICE.

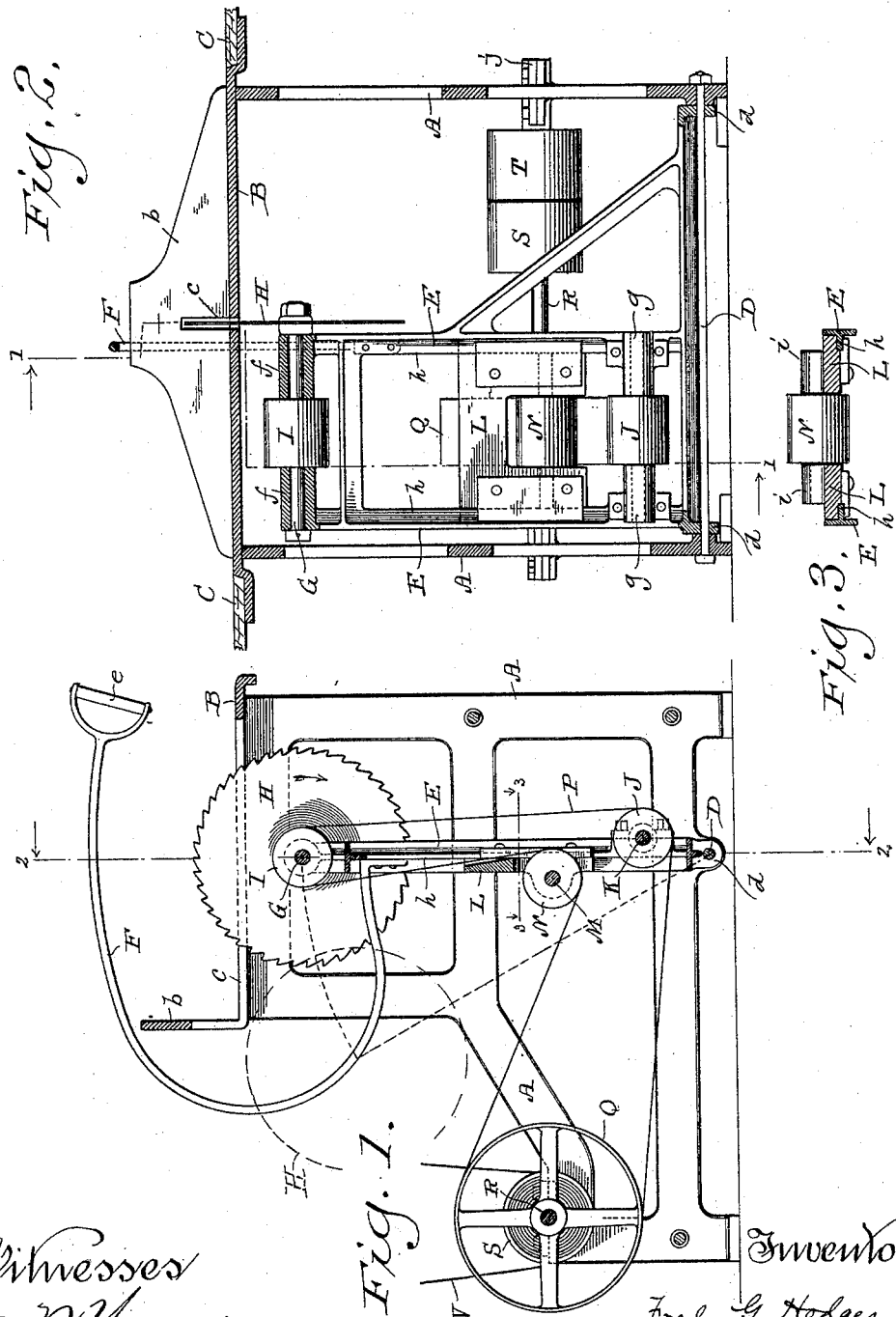

FRED G. HODGES, OF RACINE, WISCONSIN.

SAWING-MACHINE.

SPECIFICATION forming part of Letters Patent No. 469,447, dated February 23, 1892.

Application filed January 12, 1891. Serial No. 377,435. (No model.)

*To all whom it may concern:*

Be it known that I, FRED G. HODGES, a citizen of the United States, and a resident of Racine, in the county of Racine, and in the State of Wisconsin, have invented certain new and useful Improvements in Sawing-Machines; and I do hereby declare that the following is a full, clear, and exact description thereof.

My invention consists in certain peculiarities of construction and combination of parts to be hereinafter described with reference to the accompanying drawings, and subsequently claimed.

In the drawings, Figure 1 represents a vertical longitudinal section on line 1 1 of the succeeding figure and illustrates certain parts of my machine in side elevation; Fig. 2, a vertical transverse section on line 2 2 of the preceding figure, illustrating certain of the parts in end elevation; and Fig. 3, a horizontal section on line 3 3 of Fig. 1.

Referring by letter to the drawings, A represents standards, and B a table supported thereon, this table and a flange $b$ at one edge thereof being provided with a slot $c$ in line with a saw to be hereinafter described. The edges of the table adjacent to the standards A are offset, as shown in Fig. 2, to form seats for the inner ends of boards C, that serve as flush extensions of said table in case the machine is employed in sawing long material, the outer ends of these boards being supported by any suitable means.

The standards A are united below the table by a series of brace-rods, and the lower one D of these rods engages ears $d$, belonging to a gate E, that has a curved bar F connected thereto and extended up over the flange $b$ of said table to come within easy reach of the sawyer, the free end of this bar being preferably in the form of a handle $e$, as shown in Fig. 1. The upper end of the gate is provided with bearings $f$ for the arbor G of the circular saw H, and fast on this arbor is a belt-pulley I, in line with a similar pulley J, fast on a shaft K, mounted in bearings $g$ near the lower end of said gate. The gate is also provided with guides $h$ for engagement with a sliding frame L, having bearings $i$ for the shaft M of a heavy pulley N, the latter operating as a tightener for a belt P, that is arranged on the pulleys I J, and another pulley Q on a counter-shaft R, the latter having its bearings $j$ on the standards A and carrying a tight pulley S and loose pulley T for a driving-belt V, said belts being illustrated in Fig. 1.

In practice the gate E is normally swung back far enough to have the saw H clear the slot $c$ in the table B, and the material to be sawed is laid on said table against the flange $b$ thereof. The sawyer now grasps the handle $e$ of the bar F and by drawing the latter toward him the gate is swung in the same direction, whereby the saw H is brought into table-slot $c$ and against the material to be operated upon, the swing of said gate and saw being illustrated by dotted lines in Fig. 1. When the driving-belt V is on the tight pulley S of the shaft R and the pulleys I J Q connected by the belt P, the saw H has a continuous rotation, the tightener-pulley N being self-adjusting to compensate for the swing of the gate E on the brace-rod D, above described.

Having thus described my invention, what I claim as new, and desire to secure by Letters Patent, is—

The combination of a main frame comprising suitable standards connected by cross-braces, a slotted table supported on the main frame and provided at one end with a vertically-disposed and slotted flange, a swinging gate carrying a circular saw in line with the table and flange-slot, a handle-bar extending from the gate above the table-flange and toward the sawyer, a drive mechanism for the saw, consisting of a system of pulleys and belts, vertically-disposed guides upon the saw-carrying gate, a sliding frame in engagement with said guides, a shaft mounted on said sliding frame, and a heavy pulley on said shaft in engagement with the saw-driving belt, substantially as set forth.

In testimony that I claim the foregoing I have hereunto set my hand, at Racine, in the county of Racine and State of Wisconsin, in the presence of two witnesses.

FRED G. HODGES.

Witnesses:
WM. H. LUECK,
JULIUS LUECK.